United States Patent [19]
Hogue et al.

[11] Patent Number: 5,711,552
[45] Date of Patent: Jan. 27, 1998

[54] COUPLING

[75] Inventors: Ronald Lee Hogue; Kenneth Ray Renkes, both of Morrison, Ill.

[73] Assignee: General Electric Company, Schenectady, N.Y.

[21] Appl. No.: 416,965

[22] Filed: Apr. 5, 1995

[51] Int. Cl.$^6$ ............................................. F16L 39/00
[52] U.S. Cl. ........................ 285/319; 285/351; 285/906
[58] Field of Search ................................ 285/319, 351, 285/921, 906

[56] References Cited

U.S. PATENT DOCUMENTS

| | | |
|---|---|---|
| 116,655 | 7/1871 | Westinghouse ............... 285/319 X |
| 980,677 | 3/1911 | Rhoads . |
| 1,284,358 | 11/1918 | Kelley ............................ 285/319 |
| 2,076,121 | 4/1937 | Dickinson . |
| 2,333,243 | 11/1943 | Glab . |
| 3,799,453 | 3/1974 | Hart . |
| 3,876,234 | 4/1975 | Harms . |
| 4,035,005 | 7/1977 | DeVincent et al. ............ 285/319 |
| 4,756,558 | 7/1988 | Beamer ........................ 285/319 X |
| 4,758,023 | 7/1988 | Vermillion . |
| 4,869,428 | 9/1989 | Gombar . |
| 4,948,931 | 8/1990 | Nixon et al. . |
| 5,112,571 | 5/1992 | Manska . |
| 5,153,396 | 10/1992 | Cummings . |
| 5,267,757 | 12/1993 | Palu .............................. 285/319 X |
| 5,303,963 | 4/1994 | McNaughton et al. ........... 285/319 |
| 5,406,980 | 4/1995 | Allread et al. ................ 285/319 X |
| 5,489,125 | 2/1996 | Hohmann ..................... 285/319 X |
| 5,540,463 | 7/1996 | Potokar ........................... 285/319 |

Primary Examiner—Dave W. Arola

[57] ABSTRACT

A threadless coupling for pressurized systems includes, in one form, a nut member and a mating member. The nut member, in one embodiment, has a first axial end for attachment to the pressure sensitive control, a second axial end configured for engagement with the mating member, and a housing extending between the first axial end and the second axial end. The housing includes a pair of openings spaced 180° apart and configured for locking engagement with a pair of retaining tabs extending from an outer surface of the mating member. Each housing opening includes a step surface and a seating surface. During assembly, the mating member retaining tabs are positioned 90° out of alignment with the housing openings. A portion of the mating member including the retaining tabs is then inserted into the nut member. When the retaining tabs are axially aligned with the housing openings, the nut member is turned 90° so that the housing openings are aligned with the retaining tabs. Each mating member retaining tab engages a corresponding seating surface and step surface of the respective housing opening so that relative axial and rotational movement of the nut member and mating member is prevented.

17 Claims, 5 Drawing Sheets

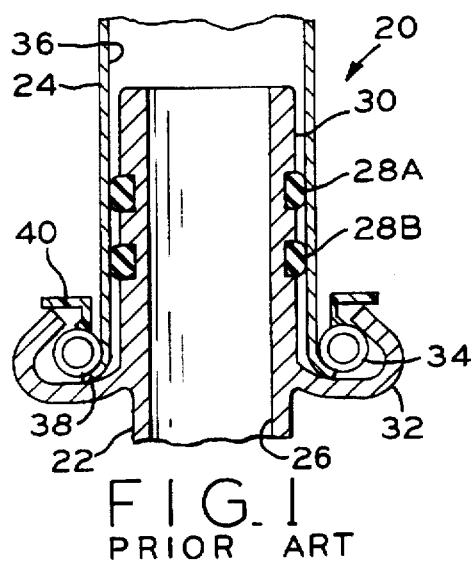
FIG_1 PRIOR ART
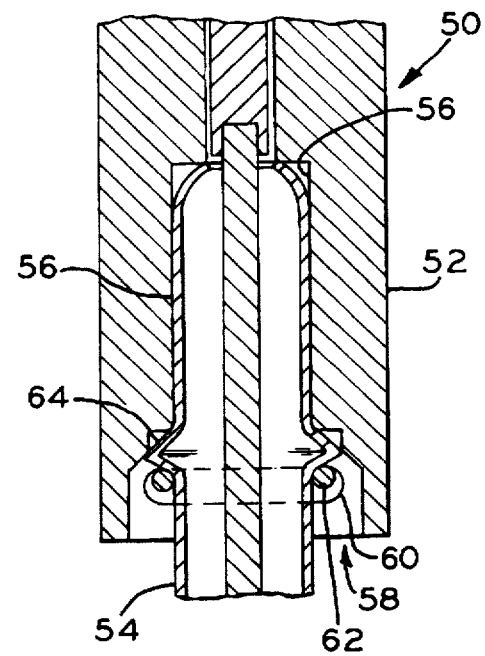
FIG_2 PRIOR ART
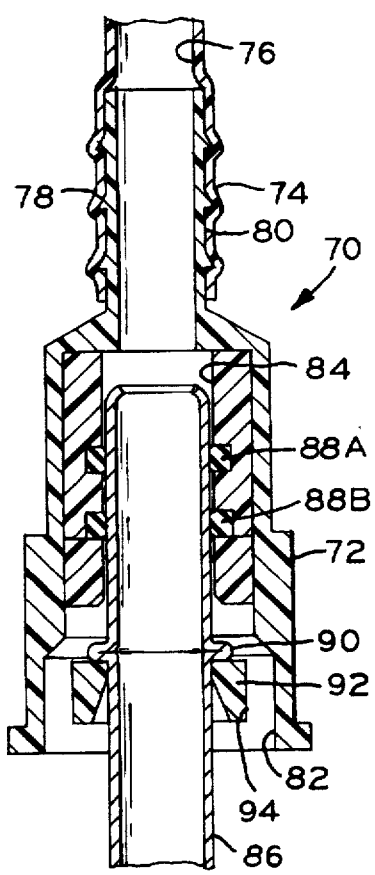
FIG_3 PRIOR ART
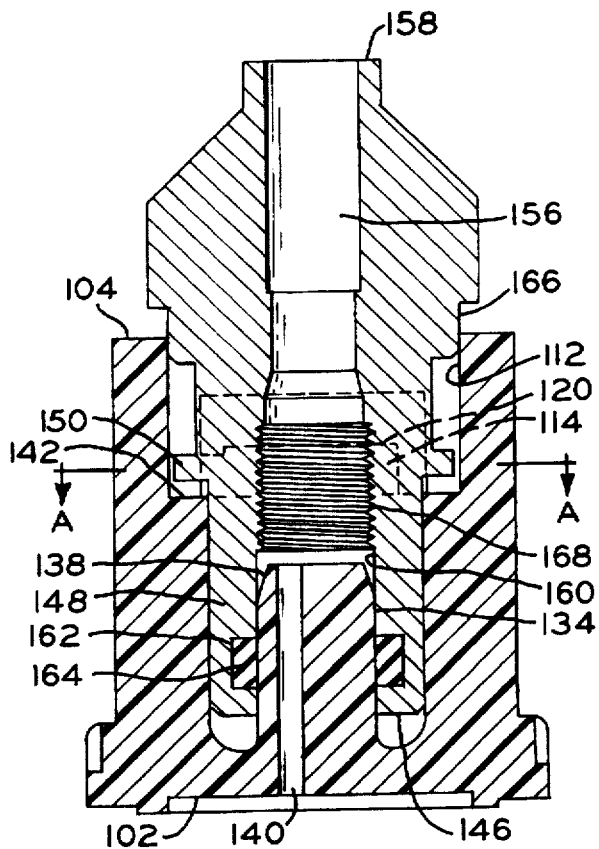
FIG_5

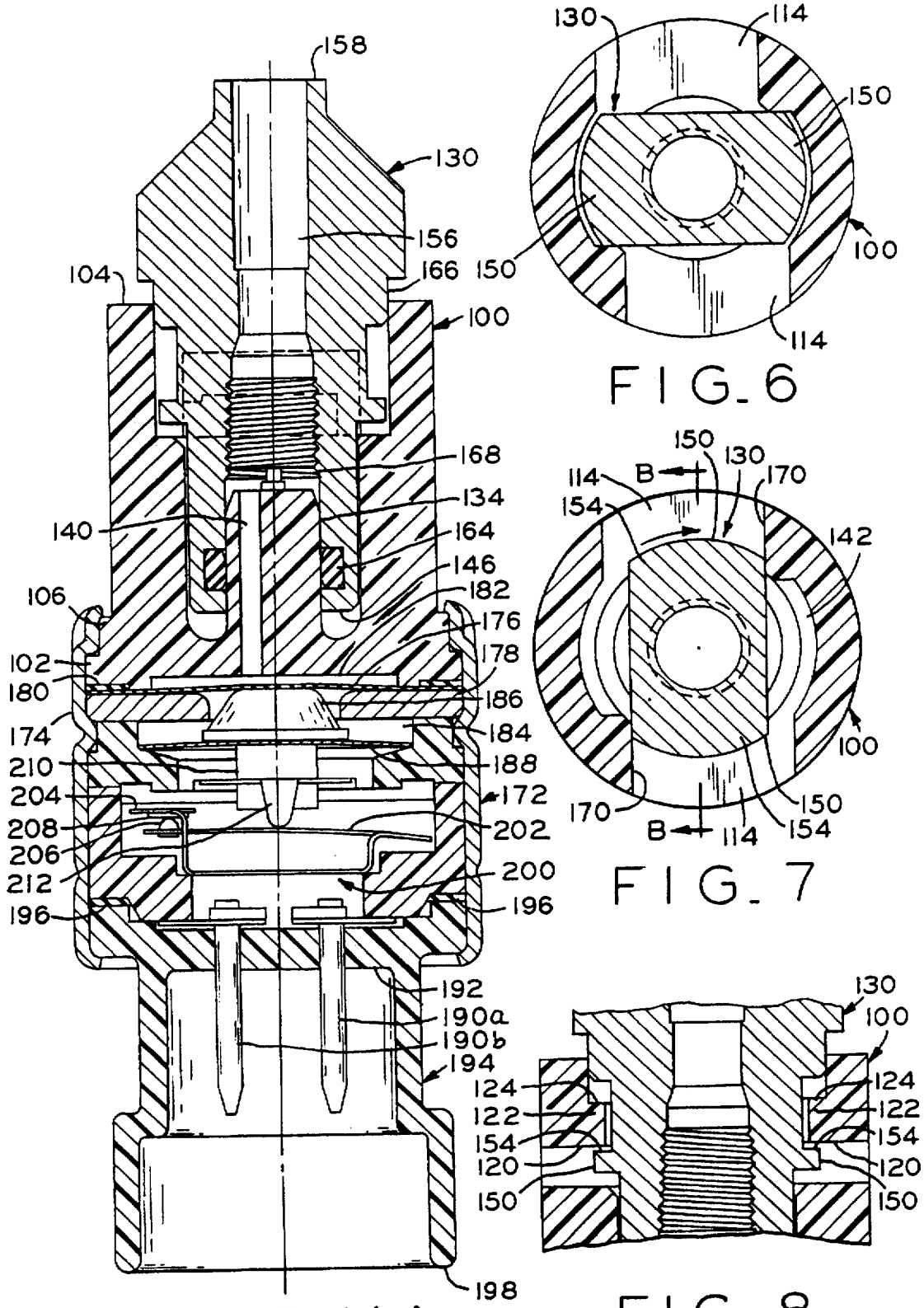

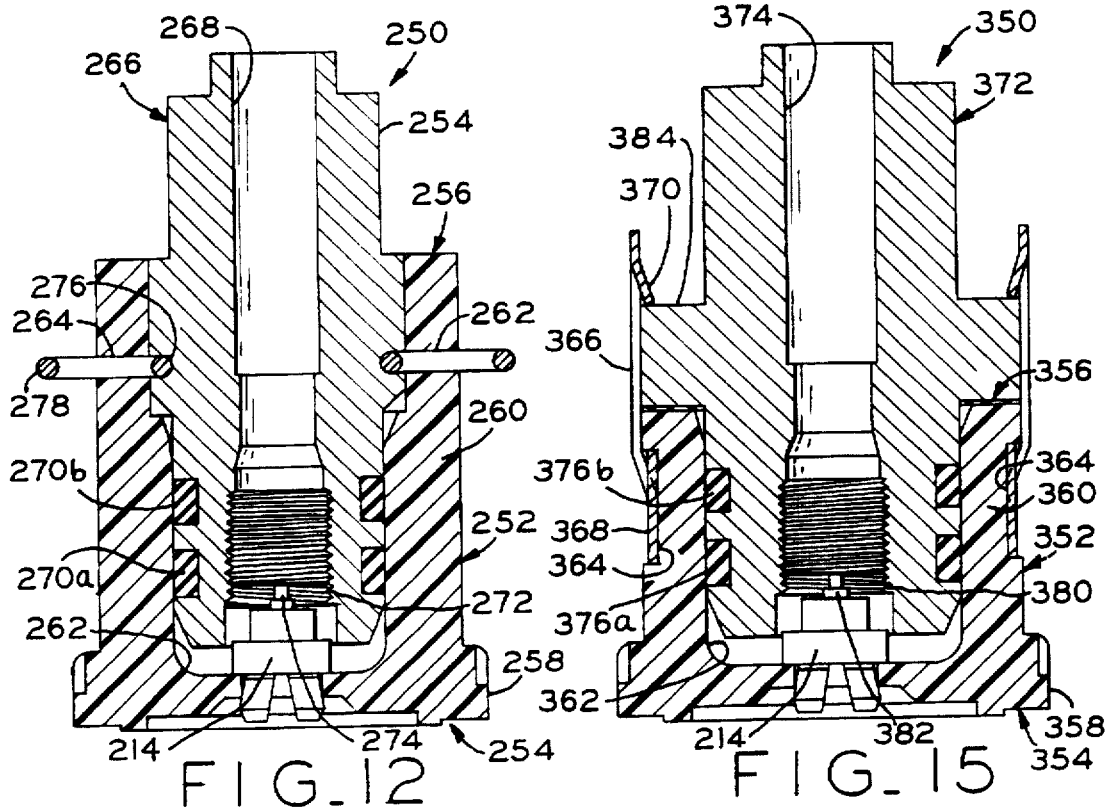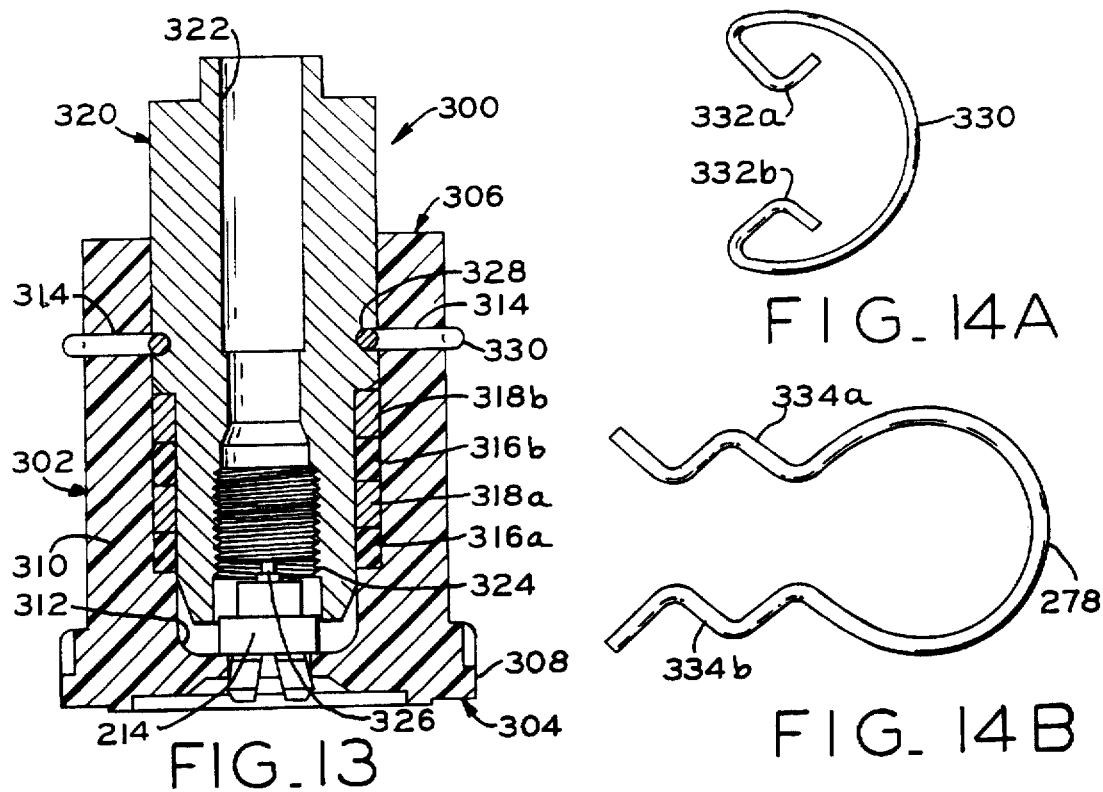

COUPLING

FIELD OF THE INVENTION

This invention relates generally to an attachment for securing pressure sensitive controls to systems which operate under high or low pressures, or both, and more particularly, to a threadless coupling for securing pressure sensitive switches to such systems.

BACKGROUND OF THE INVENTION

Generally, in systems which operate under high or low pressures, or both, pressure sensitive controls responsive to predetermined high or low pressures are utilized to enhance system performance. Such controls also increase the system operating life by controlling the pressure within the system to be within a predetermined range. For example, in automotive air conditioning systems which include a compressor, extremely high pressures can adversely affect the operating life of the compressor and other components within the system. To prevent the pressures within such systems from reaching such high magnitudes, a pressure sensitive control responds to a predetermined high pressure by, for example, de-energizing the compressor. When the pressure within the system returns to a predetermined safe level, the pressure sensitive control responds by energizing the compressor.

Many known pressure sensitive controls have been used with such pressurized systems. One example of such a control is described in Hogue et al., U.S. Pat. No. 5,300,741, which is assigned to the present assignee. Known pressure sensitive controls such as the control described in Hogue et al. include a snap-disc normally biased in a first position which "snaps" to a second position in response to a predetermined pressure within a pressurized system. A movable contact and a stationary contact are included within the control. The movable contact moves in response to the movement of the snap-disc.

In a typical application, the pressure sensitive control is coupled between an energy source and a compressor clutch of the pressurized system. Under normal conditions, the moveable contact engages the stationary contact in a circuit-making condition and the compressor is energized. If the pressure within the system exceeds a predetermined level, the snap-disc "snaps" to the second position causing the moveable contact to move away from the stationary contact into a circuit-breaking condition. In the circuit-breaking condition, energy to the compressor is cut off thereby preventing the pressure within the system from increasing. When the pressure within the system returns to a predetermined safe level, the snap-disc returns to its normal position, i.e., the first position, the movable contact again engages the stationary contact, and the compressor is energized.

In addition to controlling energization of the compressor motor, such switches also are used to control compressor cycling and cooling fans and low pressure cut-outs. For example, with respect to low pressure cut outs, when the system pressure falls below a predetermined level, the control causes the system compressor to be de-energized.

Known pressure sensitive controls are attached to pressurized systems by threaded couplings. The manufacture of threaded components for the couplings involves cutting, rolling, tapping or, in the case of plastic parts, molding thread details in the parts. These operations are expensive, regardless of the method or type of material used. The assembly expense of threaded components is also high because proper mating of threaded components requires special tooling for tightening the components to a specific torque. The tooling and torque requirements also increase the time required for assembly and disassembly.

In addition to the time and expense associated with threaded members, problems can arise during assembly such as cross-threading or over stressing. Compensation for over stressing can been achieved through the use of metal components due to their increased strength over plastic components. However, the use of metal components results in higher manufacturing expense.

In an attempt to overcome the problems with threaded couplings, threadless couplings have been used in some applications. Various known threadless couplings are illustrated in FIGS. 1-3. Specifically, FIG. 1 illustrates a coupling 20 for an air conditioning system including first and second tubular members 22 and 24. First tubular member 22 includes a first passageway 26, and two o-rings 28A-B are inserted in annular grooves formed in outer surface 30 of such member 22. First tubular member 22 also has a spring retaining housing 32 with a spring 34 therein. Second tubular member 24 includes a second passageway 36 and, at its mating end, forms a lip 38.

To engage first and second tubular members 22 and 24, lip 38 of second member 24 is inserted into housing 32 and forced under spring 34. Spring 34 retains lip 38 within housing 32. A snap ring 40 may be fit over spring 34 and into engagement with housing 32.

Another known coupling 50 is illustrated in FIG. 2. Coupling 50 may be used in connection with speedometer cable for an automobile. Coupling 50 includes a connector 52 which receives a mating member 54 attached to one end of the speedometer cable. Connector 52 includes a passageway 56. One end of passageway 56 is enlarged. A slot 60 is formed in connector 52 and a substantially u-shaped resilient wire retaining member 62 is inserted through slot 60. Mating member 54 has an annular flange 64 formed at an intermediate location along its length.

To engage mating member 54 with connector 52, mating member 54 is inserted into passageway 56. Flange 64 is inserted through resilient retaining member 62, which expands to allow flange 64 pass therethrough. Once flange 64 is inserted through member 62, member 62 contracts to its normal configuration. Cooperation of flange 64 and retaining member 62 maintains engagement between mating member 54 and connector 52.

A coupling 70 for an automobile fuel filter is illustrated in FIG. 3. A connector 72 is engaged to tube 74 having a passageway 76. Specifically, ridges 78 are formed on a tubular extension 80 of connector 72, and tube 74 is pushed over ridges 78. Connector 72 also includes an opening 82 and a passageway 84 sized to receive a tubular extension 86 of a fuel filter. Two o-rings 88A-B are mounted in grooves formed in passageway 84. An annular flange 90 is formed at an intermediate location along tubular extension 86. A plastic clip 92 is inserted through openings 94 formed in connector 72. Clip 92 cooperates with flange 90 to maintain tubular extension 86 and connector 72 in engagement.

Although such threadless couplings are useful in some applications, there still exists a need for a threadless coupling that can be utilized in both high and low pressure controls and in connection with fluid flow valves, such as a Schrader valve, if desired. A Schrader valve, for example, allows replacement of a switch in a pressurized system without having to evacuate and re-charge the system. Further, there exists a need for such a threadless coupling that is inexpensive to manufacture and is easy to assemble and disassemble.

3

Accordingly, it is desirable and advantageous to provide a coupling for pressure sensitive controls that does not require the use of threaded members. It also is desirable and advantageous to provide a coupling for both high and low pressure sensitive controls that is inexpensive to manufacture and simple to assemble and disassemble.

An object of the present invention is to provide a reliable coupling for securing pressure sensitive controls to systems which operate under high or low pressures or both.

Another object of the present invention is to provide a threadless coupling for pressure sensitive controls which is inexpensive to manufacture and can be formed of plastic or metal.

Still another object of the present invention is to provide a coupling for pressure sensitive controls that can be quickly and easily assembled and disassembled.

SUMMARY OF THE INVENTION

These and other objects are attained by an apparatus which, in one embodiment, is a threadless coupling assembly including a nut member and a mating member which can be quickly and easily assembled and disassembled. The nut member includes a first axial end which attaches to a pressure sensitive control. An opening is formed in the first axial end of the nut member. A substantially cylindrical housing having an outer surface and an inner surface extends between the first axial end and a second axial end of the nut member. A pair of openings spaced 180° apart are provided in the housing intermediate the first and second axial ends. A peripheral surface of each opening includes a circumferentially extending seating surface and an axially extending step surface extending from the seating surface. A retaining rib extends radially inward from the inner surface of the housing.

Within the cylindrical housing, a cylindrical center prong extends from the first axial end towards the second axial end of the nut member. A tapered surface is provided along an interior end of the center prong. A channel extends longitudinally through the center prong from the interior end of the prong to the first axial end of the nut member. The channel is in communication with the opening in the first axial end of the nut member.

A portion of the mating member is configured for insertion within the nut member. Specifically, the mating member includes a nut engaging end having a substantially cylindrical portion. An inner surface of the mating member cylindrical portion is configured for matingly engaging an outer surface of the nut member center prong. An o-ring for sealingly engaging the outer surface of the center prong is provided within a cylindrical recess formed in the inner surface of the mating member cylindrical portion. The tapered surface of the center prong interior end facilitates mounting the mating member to the center prong.

A pair of radially outward extending retaining tabs spaced 180° apart extend from the outer surface of the mating member. Each of the retaining tabs is configured for engaging one of the housing openings such that a retaining surface of the mating member retaining tab engages the seating surface of the housing opening thereby preventing relative axial movement of the mating member and the nut member. Similarly, each mating member retaining tab is configured to engage the step surface of the housing opening thereby preventing, or at least limiting, relative rotational movement of the mating member and the nut member.

A channel is formed in and extends longitudinally through the mating member. The channel includes, at one end, a threaded region configured to receive a threaded check valve such as a Schrader valve depression pin. At the other end of the channel, the mating member is configured to be coupled to a pressure line of the pressurized system.

To assemble the nut member and the mating member, the nut member and the mating member are positioned such that the mating member retaining tabs are 90° out of alignment with the housing openings. The nut engaging end of the mating member is then inserted into the second axial end of the nut member. When the retaining tabs are axially aligned with the housing openings, the nut member is rotated 90° and released. The mating member retaining tabs seat on the seating surfaces of the housing openings thereby preventing axial separation of the two members. The step surfaces of the housing openings also engage the retaining tabs and prevent relative rotation of the two members.

When the nut member and mating member are assembled, the Schrader valve depression pin engages and is depressed by the center prong of the nut member. When the Schrader valve is depressed, fluid may flow through the valve and the channel formed in the center prong of the nut member. The term "fluid", as used herein, can be a gas or a liquid or any substance in which the particles easily move and change their relative position.

A flexible membrane forming a part of a control unit covers and seals the opening in the first axial end of the nut member. The pressure of the fluid against the membrane causes the membrane to transmit force to a sensor disposed against the membrane. The sensor forms a part of the control unit and controls switching within the unit.

Disassembly of the nut member and the mating member is performed by depressing the mating member towards the nut member until the mating member retaining tabs clear the step surfaces of the housing openings. The nut member is then rotated 90° and retracted from the mating member. As the mating member is removed from the nut member, the Schrader valve depression pin moves to its closed position and prevents the escape of fluid from the system.

The coupling as described above can be used to secure numerous types of pressure sensitive controls to systems which operate under high or low pressures, or both. Also, the coupling can be used in connection with fluid flow valves, such as a Schrader valve, to enable replacement of a switch in a pressurized system without having to evacuate and re-charge the system. Further, at least as compared to other known couplings, the above described coupling is inexpensive to manufacture and is easy to assemble and disassemble. Various alternative embodiments of the coupling are contemplated, some of which are described below in detail.

BRIEF DESCRIPTION OF THE DRAWINGS

FIGS. 1–3 illustrate known threadless couplings.

FIG. 5 is a sectional side view of the mating member inserted into the nut member illustrated in FIG. 4.

FIG. 6 is a sectional view taken along line A—A of FIG. 5.

FIG. 7 is a top view of a portion of the mating member inserted into the nut member as illustrated in FIG. 4.

FIG. 8 is a sectional view taken along line B—B of FIG. 7.

FIG. 11A is a sectional side view of an assembled nut member and mating member coupled to a high pressure sensitive control and FIG. 11B is a sectional view of a nut member coupled to a low pressure sensitive control.

FIG. 12 illustrates an alternative embodiment of a threadless coupler.

FIG. 13 illustrates another alternative embodiment of a threadless coupler.

FIGSs. 14A–B illustrate alternative embodiments of wire clips that may be used in connection with the couplers illustrated in FIGS. 12 and 13.

FIG. 15 illustrates still another alternative embodiment of a threadless coupler.

DETAILED DESCRIPTION OF THE DRAWINGS

Figure 4:
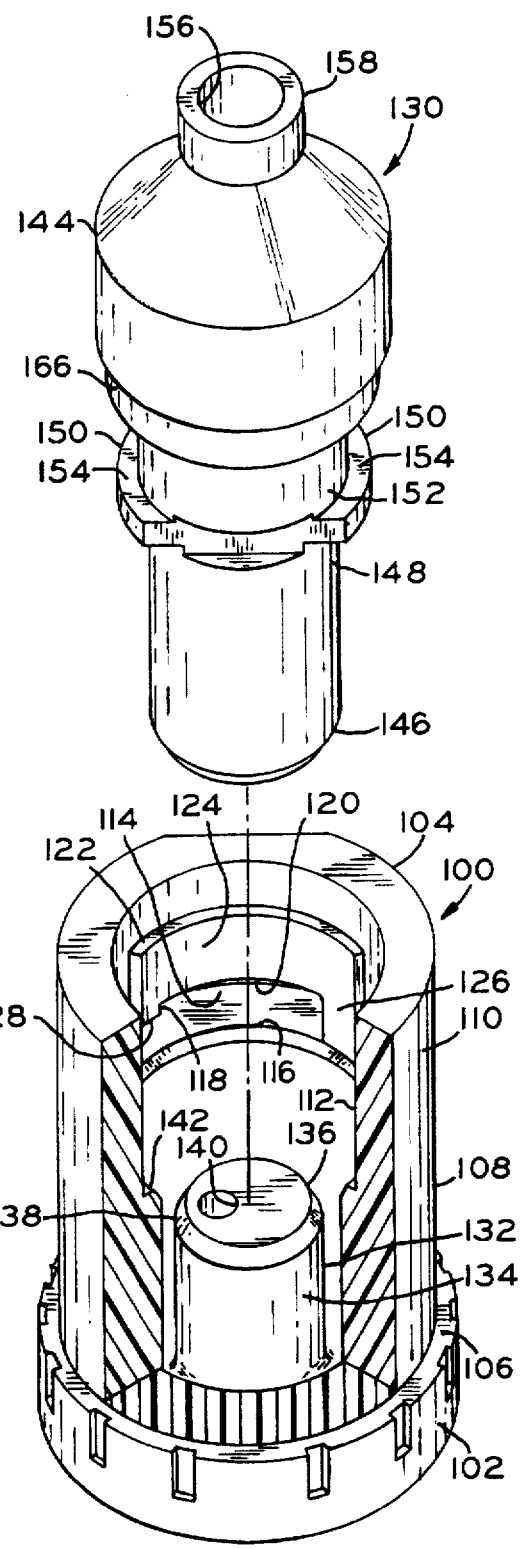
FIG. 4 is an exploded view, with parts cut away, of a first embodiment of a nut member and a mating member.

A nut member 100 having a first axial end 102 and a second axial end 104 is illustrated in FIG. 4. First axial end 102 includes a lip portion 106 configured for being attached to a pressure sensitive control as hereinafter described. A substantially cylindrical housing 108 extends between first axial end 102 and second axial end 104 and includes an outer surface 110 and an inner surface 112. Openings 114 (only one opening 114 is shown in FIG. 4) spaced 180° apart are formed in cylindrical housing 108 intermediate first end 102 and second end 104. A peripheral surface 116 defining each opening 114 includes an axial step surface 118 and a circumferential seating surface 120. Retaining ribs 122 extend radially inward from inner surface 112 and include circumferentially extending portions 124, axially extending portions 126, and step portions 128 which correspond to step surfaces 118.

A mating member 130 is configured for insertion within nut housing 108 and mating engagement with a housing center prong 132. Cylindrical center prong 132 extends from first axial end 102 of nut member 100 towards second axial end 104. Center prong 132 includes a cylindrical outer surface 134 positioned substantially co-axial with cylindrical housing 108. An interior end 136 of center prong 132 includes a tapered surface 138. A channel 140 extends longitudinally through center prong 132 to first axial end 102 of nut member 100. A circumferentially extending stop surface 142 is formed on housing inner surface 112 and limits the extent to which center prong 132 can be inserted within mating member 130.

Mating member 130 includes a stem portion 144 and a nut engaging end 146 having a substantially cylindrical portion 148 configured for insertion within nut housing 108 and mating engagement with housing center prong 132. A pair of retaining tabs 150 spaced 180° apart extend radially outward from an outer surface 152 of mating member 130. Each mating member retaining tab 150 is configured for insertion within a corresponding housing opening 108 and includes an upwardly facing retaining surface 154. Nut member stop surface 142 is spaced from seating surfaces 120 so that a mating member retaining tab 150 inserted in a housing opening 114 can be moved axially a distance sufficient to allow retaining tab 150 to clear step surface 118. A channel 156 extends longitudinally from nut engaging end 146 to an opposite end 158 and provides fluid communication between opposite end 158 and nut engaging end 146. Opposite end 158 of mating member 130 is configured for attaching, for example, to flexible tubing carrying fluid of a system which operates under high or low pressures, or both. One end of such tube, for example, is secured to end 158 and the other end of the tube is connected to the pressurized system. Opposite end 158 of mating member 130 could, of course, be coupled to other components of a system such as an accumulator.

FIG. 5 is a sectional view of mating member 130 inserted into nut member 100. Mating member cylindrical portion 148 includes a cylindrical inner surface 160 configured to engage center prong outer surface 134. Mating member inner surface 160 includes a recess 162 having an o-ring 164 for sealing engagement between mating member inner surface 160 and center prong outer surface 134. Tapered surface 138 allows o-ring 164 to easily slide over center prong outer surface 134. Housing stop surface 142 is configured to engage mating member retaining tabs 150 for limiting the extent to which mating member 130 can be inserted into nut member 100. A stabilizing portion 166 of mating member 130 is sized to engage housing inner surface 112 for providing stability between mating member 130 and nut member 100.

Channel 156 extends longitudinally through mating member 130 and includes an internally threaded region 168. A Schrader valve (not shown) may be threadedly engaged to mating member 130 at threaded region 168. Center prong channel 140 and mating member channel 150 allow for fluid communication between nut member first axial end 102 and mating member opposite end 158.

With respect to assembly of nut member 100 and mating member 130, and still referring to FIG. 5, mating member 130 and nut member 100 are co-axially aligned and each mating member retaining tab 150 is positioned 90° out of alignment with a corresponding housing opening 114. Mating member nut engaging end 146 is then inserted into housing 108 at second axial end 104 until mating member retaining tabs 150 engage housing stop surface 142. Mating member cylindrical portion 148 slides over housing center prong 132 and o-ring 164 sealingly engages center prong outer surface 134.

When nut member 100 and mating member 130 are so assembled, the Schrader valve depression pin engages and is depressed by center prong 132. Fluid from the pressurized system then flows through channel 156, through the Schrader valve, and through channel 140. A flexible membrane, as hereinafter described, is placed over the opening in first axial end 102 of nut member 100 and prevents the escape of fluid from the assembled nut member 100 and mating member 130.

Although not shown in FIG. 5, another o-ring could be disposed within nut member 100 around center prong outer surface and in the gap between nut engaging end 146 of mating member 130 and nut member 100. When mating member 130 is inserted within nut 100, such o-ring would be compressed. When mating member retaining tabs 150 are inserted in housing openings 114 and mating member 130 is released, the o-ring exerts a force so as to press retaining tabs 150 in position against seating surface 120 and provides a redundant seal. Such an o-ring could, of course, be used in connection with each threadless coupling embodiment described herein. Also, as an alternative to the o-ring, a spring which is biased to force such retaining tabs 150 against seating surface 120 could be used.

FIG. 6 is a cross sectional view of nut member 100 and mating member 130 taken along line A—A of FIG. 5. Mating member retaining tabs 150 are 90° out of alignment with housing openings 114. After mating member nut engaging end 146 has been inserted to a point where mating member retaining tabs 150 engage housing stop surface 142, mating member 130 is then rotated 90° so that mating member retaining tabs 150 align with housing openings 114 as illustrated in FIG. 7. As shown in FIG. 7, a side surface 170 of housing opening 114 engages mating member retaining tabs 150 and prevents mating member 130 from being rotated past housing openings 114.

FIG. 8 is a sectional view taken along line B—B of FIG. 7. As shown in FIG. 8, retaining surfaces 154 of mating member retaining tabs 150 engage corresponding seating surfaces 120 of nut member 100. Such engagement prevents axial disengagement of mating member 130 from nut member 100. A portion of seating surface 120 is formed by circumferential portion 124 of nut member retaining rib 122.

Figure 9:
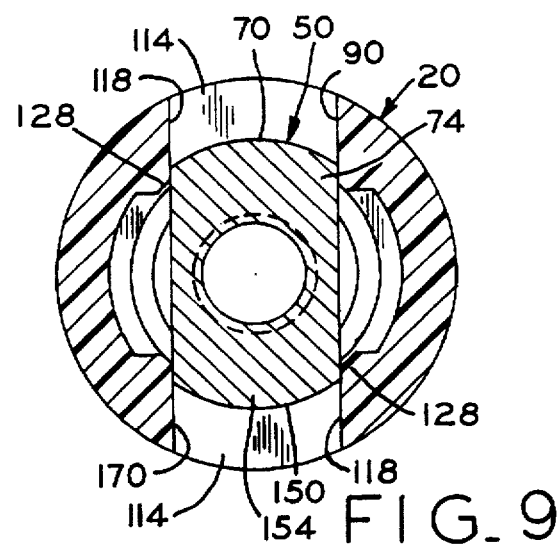
FIG. 9 is a top view of a portion of the mating member inserted into the nut member as illustrated in FIG. 4.

FIG. 9 is a top view of mating member 130 inserted into nut member 100 after mating member 130 has been rotated and released. In FIG. 9, retaining surfaces 154 have engaged seating surfaces 120. Relative rotational movement of nut member 100 and mating member 130 is prevented by step surfaces 118 and side surfaces 170 of housing openings 114. Retaining rib step portions 128 form a portion of step surfaces 118.

Figure 10:
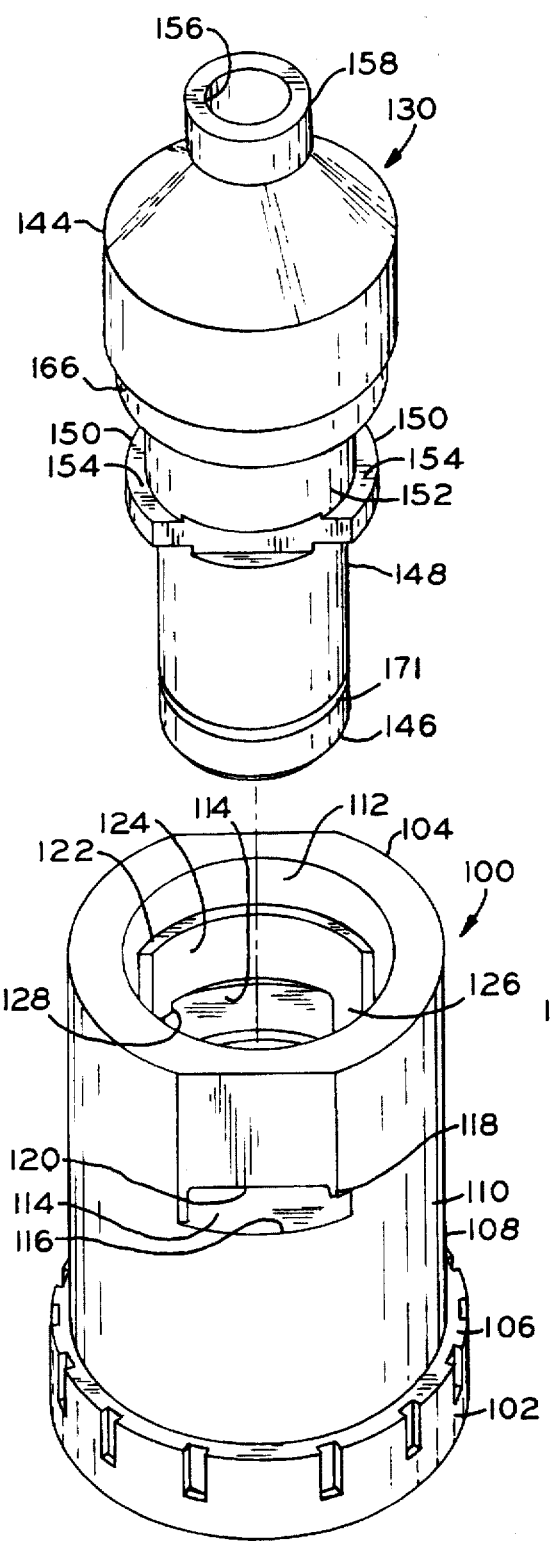
FIG. 10 is an exploded view of a second embodiment of a nut member and a mating member.

FIG. 10 is an exploded view of another embodiment of nut member 100 and a mating member 130. The same reference numbers used in FIG. 4 are used in FIG. 5 to refer to identical or similar elements shown in FIG. 4. In the embodiment illustrated in FIG. 5, and as compared to the FIG. 4 embodiment, central prong 132 is eliminated from nut member 100 and internal o-ring 164 is eliminated from cylindrical portion 148. An external o-ring 171, however, is added and is secured to an external surface of cylindrical portion 148. O-ring 171 forms a seal with the internal surface of nut member 100. A depression member (not shown) is mounted in the opening in first axial end 102 of nut member 100. When mating member 130 is inserted within nut member 100, the depression member depresses the Schrader valve pin causing the valve to open.

FIG. 11A is a sectional view of mating member 130 inserted into nut member 100. Nut member first axial end 102 is attached to a pressure sensitive control 172 by a tubular sleeve 174 which crimps over lip portion 106. Mating member opposite end 158 is attached to a pressurized system (not shown) such that channel 156 is in communication with a pressurized fluid within the system. Mating member internally threaded region 168 contains a valve (not shown) such as a Schrader valve including a depression pin positioned so that when mating member 130 is assembled to nut member 100, the Schrader valve is opened.

Pressure sensitive control 172, which generally is utilized in connection with a high pressure system, includes a diaphragm 176 comprising a circular disc of flexible material clamped at its peripheral edge margins between nut member 100 and a metal washer 178. A sealing gasket 180 disposed between diaphragm 176 and nut 100 forms a pressure seal. Diaphragm 176 forms a first chamber 182 between nut member 100 and diaphragm 176 and a second chamber 184 below diaphragm 176. Communication of pressure between the pressurized system and pressure sensitive control 172 results in a pressure differential between first chamber 182 and second chamber 184. An inverted cup-shaped force transmitting member 186, or piston, is located between diaphragm 176 and a snap-disc 188. Snap-disc 188 is operable between two configurations, a convex configuration in which snap-disc 188 bows towards force transmitting member 186, as shown in FIG. 11A, and a concave configuration in which snap-disc 188 bows away from force transmitting member 186. Movement of snap-disc 188 from its convex configuration to its concave configuration is produced by the application of pressure to snap-disc 188 from diaphragm 176 through force transmitting member 186.

Figure 11B:
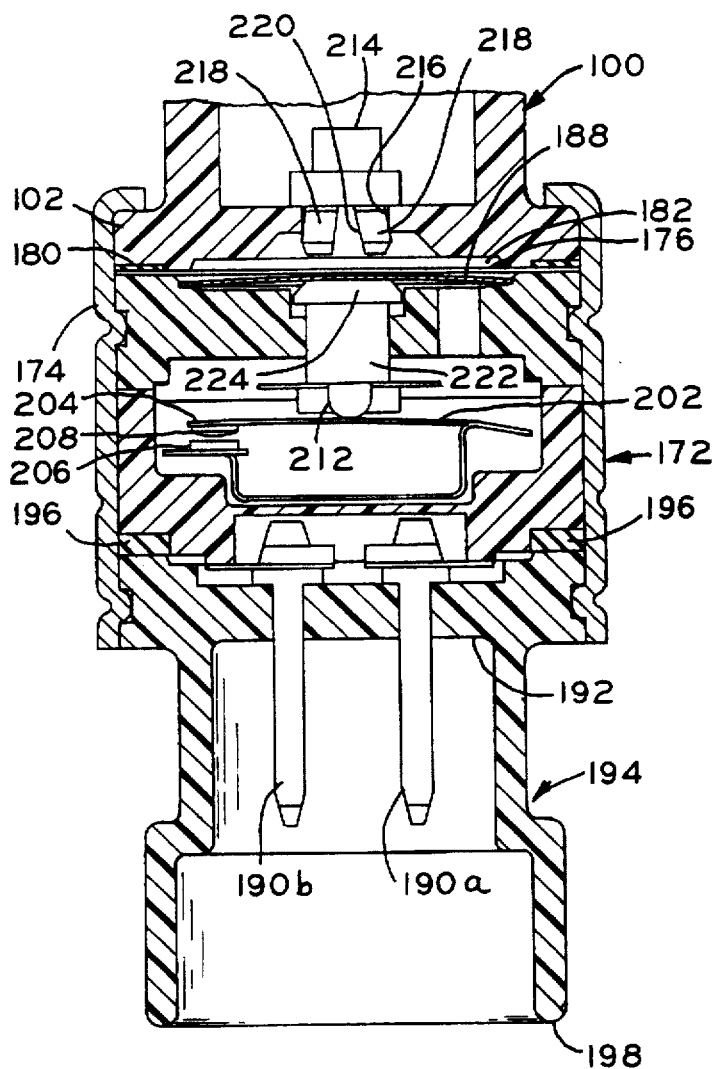

A pair of terminal pins 190a and 190b are mounted on and extend through an inner end 192 of an electrical connector 194. Connector 194 is attached to control 172 by tubular sleeve 174 which is crimped over (or crimped to as shown in FIG. 11B) a portion of such connector 194. A gasket 196 forms a weather resistant seal between connector 194 and control 172. An opposite end 198 of connector 194 is open for receiving a mating electrical connector of a control circuit of an apparatus to be controlled, such as the compressor of an air conditioning system. The type of electrical connector 194 may vary depending upon the specific type of electrical connector to which the pressure sensitive control 172 must be connected.

A switch 200 in second chamber 184 of pressure sensitive control 172 includes a resilient switch blade 202 and a stationary contact support 204. Switch blade 202 includes a cantilevered arm extending across second chamber 184 having a movable contact 206 at its free end aligned with a stationary contact 208 on stationary contact support 204. Switch blade 202 is permanently electrically connected to one terminal pin 190a and contact support 204 is permanently electrically connected to remaining terminal pin 190b. Switch blade 202 is movable between an open position and a closed position. In the open position, movable contact 206 is spaced from stationary contact 208 in a circuit-breaking condition between terminal pins 190a and 190b. In the closed position, movable contact 206 engages stationary contact 208 in a circuit-making condition between terminal pins 190a and 190b. Switch blade 202 is normally biased to either the closed position as shown or, alternatively, to the open position.

A disc-shaped actuator 210 is positioned between snap-disc 188 and switch blade 202 and includes a finger portion 212 projecting toward and engaging switch blade 202. Actuator 210 moves toward switch blade 202 in response to movement of snap-disc 188 to its concave configuration and finger portion 212 thereby moves switch blade 202 to is open position. Similarly, when snap-disc 188 returns to its convex configuration actuator 208 moves away from switch blade 202 thereby returning switch blade 202 to its closed position.

Electrical connector 194, for example, is connected, in series circuit with a particular component of the pressurized system, such as a compressor clutch in an automotive air conditioning system. Mating member opposite end 158 is attached to the pressurized system allowing fluid communication between channel 156 and the system. The check valve may be located in threaded region 168 is depressed allowing fluid communication between mating member channel 156 and center prong channel 140. Center prong channel 140 is in fluid communication with first chamber 182 of pressure sensitive control 172. Accordingly, pressure sensitive control 172 is in communication with the pressurized fluid within the pressurized system allowing pressure sensitive control 172 to respond to pressures within the system.

Under normal operating conditions, switch blade 202 is in its closed position such that terminal pins 190a and 190b are electrically connected as described above. As a result, the compressor clutch is energized. When the pressure within the system reaches a predetermined upper limit, pressure transmitted to snap-disc 188 from diaphragm 176 through force transmitting member 186 causes snap-disc 188 to move from its convex configuration to its concave configuration. Movement of snap-disc 188 to its concave configuration causes actuator 210 to move towards switch blade 200 and finger portion 212 causes switch blade 202 to move to its open position such that terminal pins 190a and 190b are no longer electrically connected. The compressor motor is therefore de-energized and a further increase of the pressure within the system is prevented. When the pressure within the system decreases to a predetermined safe level, snap-disc 188, actuator 210, and switch blade 202 respond by returning to their normal positions and the compressor motor is once again energized.

Although described above in a specific context, mating member 130 and nut member 100 can be used in numerous types of pressure sensitive controls for numerous types of pressurized systems. Nut member 100 and mating member 130 provide quick and easy threadless attachment of such pressure sensitive controls to pressurized systems.

FIG. 11B is a sectional view of an alternative embodiment of nut member 100 coupled to a pressure sensitive control 172 configured for low pressure operation. The same reference numbers used in FIG. 11A are used in FIG. 11B to refer to identical or similar elements shown in FIG. 11A. With respect to the FIG. 11B embodiment, piston 186 is eliminated and snap-disc 188 is mounted to be in direct contact with diaphragm 176.

As shown in FIG. 11B, nut member 100 is configured for mating with a mating member having an external o-ring (see FIG. 10 embodiment of mating member 130). A Schrader valve depression member 214 is shown being inserted into an opening 216 formed in nut member 100. Depression member 214 includes prongs 218 which are inserted through opening 216. Prongs 218 define channels 220 through which fluid may flow and act against diaphragm 176. When mating member 130 is fully inserted within nut member 100, the Schrader valve forced against, and opened by, depression member 214.

An actuator 222 having finger 212 and a head 224 in contact with snap-disc 188 is movable under the control of snap-disc 188. Actuator 222 is shown in FIG. 11B in a first position in which contacts 206 and 208 are in a circuit-breaking condition. When sufficient force is exerted against diaphragm 176 to cause snap-disc 188 to snap from its convex to concave configuration, actuator 222 is forced towards resilient switch blade 202. Blade 202 moves to its closed position thereby moving movable contact 206 to its circuit-making condition.

Although only two pressure switches are illustrated herein, many alternative switch configurations are contemplated and possible. The threadless couplings described herein certainly are not limited to use with any one particular pressure responsive switch.

Another embodiment of a threadless coupling 250 is illustrated in FIG. 12. Coupling 250 includes a nut member 252 having a first axial end 254 and a second axial end 256. First axial end 254 includes a lip portion 258 which is configured for being attached to a pressure sensitive control as hereinbefore described. A substantially cylindrical housing 260 extends between first axial end 254 and second axial end 256. A mating member receiving chamber 262 is formed by housing 260 and first axial end 254. Openings 264 spaced 180° apart are formed in cylindrical housing 260 intermediate first end 254 and second end 256.

A mating member 266 having a channel 268 is inserted into nut member 252. Two o-rings 270a–b are disposed within grooves formed in mating member 266. Such o-rings 270a–b provide a redundant seal between nut member 252 and mating member 266. Of course, in all the threadless coupling configurations illustrated herein with such a redundant seal, the redundant seal could be eliminated by using only one o-ring rather than two o-rings. Internal threads 272 formed within channel 268 are provided for engagement with, for example, a Schrader valve 274. An end of mating member 266 opposite Schrader valve 274 is configured for attaching to a pressurized system.

An annular groove 276 is formed in mating member 266 and, when mating member 266 is inserted within nut member 252, annular groove 276 aligns with openings 264 formed in nut member 252. A resilient retaining member or clip 278 inserted within openings 264 expands so that mating member 266 can be fully inserted within nut member 252. When fully inserted, a portion of clip 278 mates with groove 276, and cooperation between clip 278 and groove 276 maintains mating member 266 and nut member 252 in engagement. Clip 278 may be formed from a resilient metal such as steel.

Nut member 252 and mating member 266 can be utilized in a variety of applications, including the application illustrated in FIG. 11 in connection with nut member 100 and mating member 130. Use of clip 278 simplifies the assembly process so that mating member 266 merely is inserted into nut member 252 until clip 278 snaps into annular groove 276.

Another embodiment of a threadless coupling 300 is illustrated in FIG. 13. Coupling 300 is similar to coupling 250 (FIG. 12) and includes a nut member 302 having a first axial end 304 and a second axial end 306. First axial end 304 includes a lip portion 308 configured for being attached to a pressure sensitive control. A substantially cylindrical housing 310 extends between first axial end 304 and second axial end 306. A mating member receiving chamber 312 is formed by housing 310 and first axial end 304. Openings 314 spaced 180° apart are formed in cylindrical housing 310 intermediate first end 304 and second end 306. Two o-rings 316a–b are disposed within channel 318, and retaining rings 318a–b maintain o-rings 316a–b in place.

A mating member 320 having a channel 322 is inserted into nut member 302. Internal threads 324 formed within channel 322 are provided for engagement with a Schrader valve 326. An end of mating member 320 opposite Schrader valve 326 is configured for attaching to a pressurized system.

An annular groove 328 is formed in mating member 320 and, when mating member 320 is inserted within nut member 302, annular groove 328 aligns with openings 328 formed in nut member 302. A resilient retaining member or clip 330 inserted within openings 314 expands so that mating member 320 can be fully inserted within nut member 302. When fully inserted, a portion of clip 330 mates with groove 328, and cooperation between clip 330 and groove 328 maintains mating member 320 and nut member 302 in engagement. Clip 330 may be formed from a resilient metal such as steel.

Coupling 300 can be utilized in a variety of applications, including the applications illustrated in FIGS. 11A–B in connection with nut member 100 and mating member 130. Differences between coupling 300 and coupling 250 (FIG. 12) include that in coupling 300, o-rings 316a–b are secured within channel 312. With coupling 250, o-rings 270a–b are secured to mating member 266. Also, clip 278 and clip 330 are different constructions.

Specifically, clip 330 is illustrated in FIG. 14A and clip 278 is illustrated in FIG. 14B. Clip 330, as shown in FIG.

14A, is substantially u-shaped and includes insertion portions 332a–b. Such portions 332a–b mate with the annular groove formed in the mating member and provide sufficient retention so that clip 330 can be utilized in connection with both high and low pressure systems.

Similarly, clip 278 can also be used in both high and low pressure systems and includes serpentine shaped portions 334a–b. Sections of such serpentine shaped portions 334a–b mate with the annular groove in the mating member, as hereinbefore described.

Another coupling 350 is illustrated in FIG. 15. Coupling 350 includes a nut member 352 having a first axial end 354 and a second axial end 356. First axial end 354 includes a lip portion 358 configured for being attached to a pressure sensitive control. A substantially cylindrical housing 360 extends between first axial end 354 and second axial end 356. A mating member receiving chamber 362 is formed by housing 360 and first axial end 354. An annular notch 364 is formed in cylindrical housing 360 intermediate first end 354 and second end 356.

An annular shaped clip 366 includes a first portion 368 which mates with notch 364. First portion 368 is sized to be firmly engaged within notch 364 and not easily removed therefrom. Clip 366 also includes, at its other end, angularly offset portions 370. Clip 366 may be formed from a resilient steel, such as stainless steel.

A mating member 372 having a channel 374 is inserted into nut member 352. Two o-rings 376a–b are disposed within grooves formed in mating member 372. Internal threads 380 formed within channel 374 are provided for engagement with a Schrader valve 382. An end of mating member 372 opposite Schrader valve 382 is configured for attaching to a pressurized system.

Mating member 372 also includes an annular shoulder 384 sized to be inserted within nut member 352 and engaged by the angularly offset portions 370 of clip 366. Specifically, when mating member 372 is inserted within nut member 352 as shown in FIG. 15, shoulder 384 slides over offset portions 370 and compresses such portions 370. Once shoulder 384 is inserted beyond offset portions 370, such portions 370 snap into the position shown in FIG. 15 and engage shoulder 384, thereby holding mating member 372 into engagement with nut 352. As with the previously described embodiments, coupling 350 can be utilized in a variety of applications, including the application illustrated in FIG. 11 in connection with nut member 100 and mating member 130.

The couplings described above can be used to secure numerous types of pressure sensitive controls to both low and high pressurized systems. Further, at least as compared to other known couplings, the above described couplings are inexpensive to manufacture and are easy to assemble and disassemble.

From the preceding description of various couplers, it is evident that the various objects are attained. Although various embodiment have been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A coupling, comprising:

a nut member including a first axial end having an opening therein, a second axial end, a housing extending between said first and second axial ends, an annular notch in said housing at a location intermediate said first axial end and said second axial end;

a retaining clip engaged to said nut member at said annular notch, said retaining clip extending beyond the second axial end of said nut member and having angularly offset portions formed at one end thereof;

a mating member including a nut engaging end configured for insertion within said nut member, said mating member having a shoulder which, when said mating member is inserted within said nut member, is engaged by said offset portion of said retaining clip for maintaining engagement between said nut member and said mating member, said mating member further comprising a second end and a channel extending from and between said nut engaging end to said second end, and internal threads at a periphery of said channel adjacent said nut engaging end, said channel located to be in flow communication with said opening in said nut member when said mating member is inserted within said nut member and engaged to said retaining clip; and a valve depression member located within said nut member opening and configured to extend into said mating member channel when said mating member is inserted within said nut member and engaged to said retaining clip.

2. A coupling in accordance with claim 1 wherein said nut member further includes a first o-ring retained within said housing and substantially adjacent said first axial end.

3. A coupling in accordance with claim 2 wherein said nut member further includes a first retaining ring positioned substantially adjacent said first o-ring to retain said first o-ring within said housing.

4. A coupling in accordance with claim 3 wherein said nut member further comprises a second o-ring retained within said housing substantially adjacent said first retaining ring.

5. A coupling in accordance with claim 4 wherein said nut member further comprises a second retaining ring substantially adjacent said second o-ring to retain said second o-ring within said housing.

6. A coupling in accordance with claim 1 wherein said mating member includes a first o-ring disposed substantially adjacent said nut engaging end.

7. A coupling in accordance with claim 6 wherein said mating member further includes a second o-ring disposed substantially adjacent said first o-ring.

8. A coupling, comprising:

a nut member including a first axial end having an opening therein, a second axial end, and a housing extending between said first and second axial ends, an annular notch in said housing at a location intermediate said first axial end and said second axial end;

a retaining clip comprising a first substantially cylindrical shaped portion located in said annular notch, said clip extending from said annular notch to a location beyond said second axial end of said nut member and having angularly offset portions formed at one end thereof; and a mating member including a nut engaging end configured for insertion within said nut member, said mating member having a shoulder which, when said mating member is inserted within said nut member, is engaged by said offset portion of said retaining clip for maintaining engagement between said nut member and said mating member.

9. A coupling in accordance with claim 8 wherein said mating member further comprises a second end and a channel extending from and between said nut engaging end to said second end, said channel located to be in flow communication with said opening in said nut member when said mating member is inserted within said nut member and engaged to said retaining clip.

10. A coupling in accordance with claim 9 wherein said mating member further comprises internal threads at a periphery of said channel.

11. A coupling in accordance with claim 9 further comprising a valve depression member located within said nut member opening and configured to extend into said mating member channel when said mating member is inserted within said nut member and engaged to said retaining clip.

12. A coupling in accordance with claim 8 wherein said nut member further includes a first o-ring retained within said housing and substantially adjacent said first axial end.

13. A coupling in accordance with claim 12 wherein said nut member further includes a first retaining ring positioned substantially adjacent said first o-ring to retain said first o-ring within said housing.

14. A coupling in accordance with claim 13 wherein said nut member further comprises a second o-ring retained within said housing substantially adjacent said first retaining ring.

15. A coupling in accordance with claim 14 wherein said nut member further comprises a second retaining ring substantially adjacent said second o-ring to retain said second o-ring within said housing.

16. A coupling in accordance with claim 8 wherein said mating member includes a first o-ring substantially adjacent said nut engaging end.

17. A coupling in accordance with claim 16 wherein said mating member further includes a second o-ring substantially adjacent said first o-ring.

* * * * *